Feb. 13, 1934.  A. G. F. WALLGREN  1,946,652
BEARING
Filed April 15, 1931
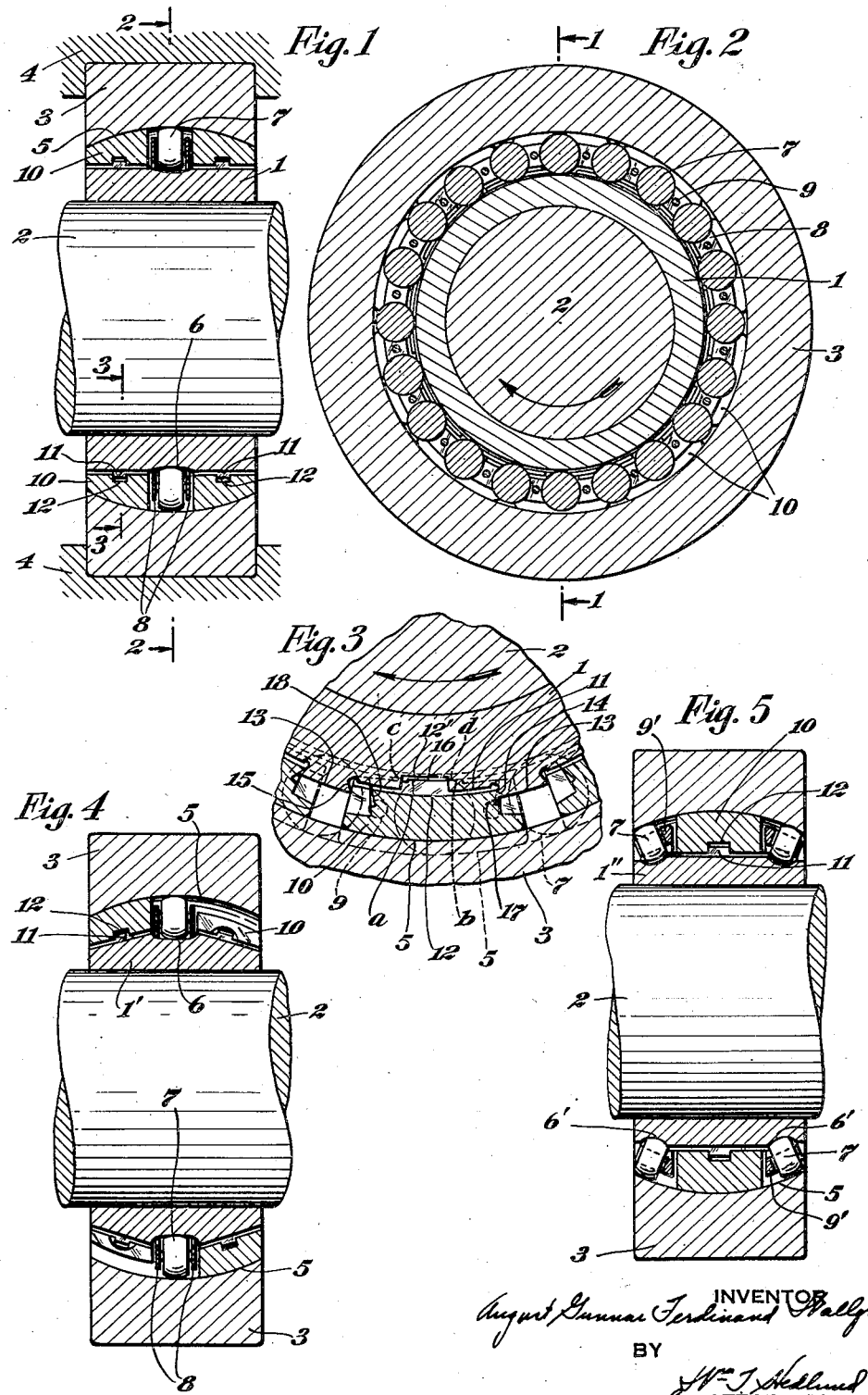

Patented Feb. 13, 1934

1,946,652

UNITED STATES PATENT OFFICE 1,946,652

BEARING

August Gunnar Ferdinand Wallgren, Stockholm, Sweden, assignor to Aktiebolaget Nomy, Stockholm, Sweden, a corporation of Sweden Application April 15, 1931, Serial No. 530,181, and in Sweden April 22, 1930

14 Claims. (Cl. 308—35)

This invention relates to bearings and has particular reference to the type of bearing in which the load is carried by sliding bearing elements or blocks having operative positions such that load sustaining oil films are formed between the blocks and the bearing surfaces with respect to which they have sliding movement.

Bearings of this character have relatively great load sustaining capacity as compared with ball or roller bearings of the same size, but they have one disadvantage in that motion is required in order to create the load sustaining oil films between the cooperating sliding surfaces in the bearing. This requirement of motion in the bearing for the formation of the desired load sustaining oil film results in relatively great starting friction since when such a bearing is under load but not in motion the effective oil film is not present between the sliding surfaces, and until this film is formed when the bearing is started there may be direct metal to metal contact between the sliding surfaces, or if such metal to metal contact is not produced the film between the surfaces is insufficient to effect the normal operating function of the device.

The principal object of the present invention is to provide an improved type of bearing of the character set forth in which the above mentioned disadvantage is eliminated and in which proper lubrication and low friction resistance are ensured under static and starting conditions as well as under normal running conditions. I accomplish this object by transmitting the bearing load under static and starting conditions of the bearing through circular bearing elements which are in rolling contact with their cooperating bearing surfaces and thus do not depend upon the formation of a particular type of oil film in order to avoid the production of an undue amount of frictional resistance, and by transferring the bearing load, when running conditions in the bearing are established, to bearing blocks of the sliding type which do not assume any of the bearing load until after the bearing has been started and the blocks have had the proper oil film formed between them and their cooperating sliding surfaces. This transfer of the bearing load from one type of bearing element to the other is accomplished automatically due to the formation of the oil film after the bearing has been started and the consequent shifting of the sliding blocks into their operative positions.

By transmitting the load in this manner the static and initial starting loads are transmitted through rolling elements productive under all conditions of a relatively low frictional resistance but of relatively small capacity, while the running load on the bearing is transmitted through sliding elements having relatively great load sustaining capacity but which are not as well suited to handle starting loads as are the rolling elements. By thus combining elements operating in rolling and sliding relation I am enabled to produce a bearing of relatively great load sustaining capacity which at the same time is not productive of high frictional resistance under any load condition and in which the undesirable possibility of metal to metal contact between elements sliding with respect to each other is avoided.

The further nature and advantages of the invention, together with the more detailed objects thereof, may best be understood from the following description of the several forms of apparatus for carrying the invention into effect which are given by way of illustration in the accompanying drawing forming a part of this specification.

In the drawing, Fig. 1 is a section of a radial bearing embodying the invention taken on the line 1—1 of Fig. 2;

Fig. 2 is a section taken on the line 2—2 of Fig. 1;

Fig. 3 is a section on an enlarged scale taken on the line 3—3 of Fig. 1;

Fig. 4 is a section similar to Fig. 1 showing another form of radial bearing; and Fig. 5 is a similar section showing still another form of bearing.

Referring now more particularly to Figs. 1 to 3, the bearing illustrated comprises an inner bearing member 1 in the form of a ring mounted on the journalled shaft 2, and an outer bearing member in the form of a ring 3 radially spaced from the inner member 1 and adapted to be mounted in a housing or bearing support indicated generally at 4. In the form illustrated the bearing members 1 and 3 have been shown as elements separate from shaft 2 and housing 4, but it will be apparent that the inner and outer bearing members may be integral with or a part of the shaft and housing respectively.

The outer ring 3 provides an inner bearing surface 5 which is preferably spherically curved as indicated, and the inner ring 1 provides a bearing surface 6 which is also preferably curved as shown, being in the form of a shallow groove. A row of circular elements 7, which in the bearing illustrated are in the form of rollers, are disposed radially between the bearing members and are adapted to engage the surfaces 5 and 6 in rolling contact. These circular elements may obviously be of a form other than that shown, such, for example, as spheres. A cage is provided to space the elements 7 peripherally, which cage may be of any suitable form. In the present instance, the cage comprises a pair of side rings 8 held in axially spaced relation by means of a plurality of pins 9, these pins passing between and separating the elements 7. A row of sliding block elements 10 is disposed between the bearing members axially to each side of the row of circular elements 7. The specific form of these sliding blocks may be varied within the scope of the invention, but I prefer to use the general type of bearing block disclosed in my copending application Serial No. 277,769 filed May 14, 1928, Patent No. 1,871,485, and bearing blocks of this type are illustrated in the present instance.

Since the rows of bearing blocks 10 are alike in form and arrangement I shall describe the construction of but one of these rows.

As will be seen from Figs. 1 to 3 the inner bearing ring 1 provides a peripherally extending projection 11 adapted to cooperate with grooves 12 in the inner faces of blocks 10 to prevent axial displacement of the blocks with respect to the ring. Projection 11 is interrupted at symmetrically spaced intervals by notches 12', and between notches 12' the projection 11 is extended as at 13 to provide abutment surfaces 14 and 15.

Axially to each side of the groove 12 the inner face of each of the blocks has a transverse projection 16 providing bearing surfaces $a$ and $b$ adapted to bear respectively against bearing surfaces $c$ and $d$ formed by the shoulders at the edges of groove 12. Each of the blocks 10 has formed at its ends the abutment surfaces 17 and 18 adapted to cooperate respectively with abutment surfaces 14 and 15. It will be noted that the distance between surfaces 17 and 18 is less than the distance between the surfaces 14 and 15, so that the block is permitted to have a certain limited amount of relative movement peripherally with respect to the ring 1. The outer surface of each block is curved to provide a surface adapted to slide with respect to the inner surface 5 of the outer bearing member 3. The thickness of the blocks 10 in radial direction is less with respect to the clearance space between the inner and outer bearing rings at points where the blocks are situated than is the radial distance of the circular elements 7 with respect to the clearance space between the inner and outer bearing rings at the points where the latter elements are located, so that the blocks 10 have a certain limited amount of radial movement between the bearing rings which permits these blocks to assume tilted operative positions.

The operation of the bearing is as follows: Let it be assumed that the bearing is stationary and is sustaining a radial load directed downwardly from shaft 2 to the housing 4. Under this static condition the load is carried by the circular elements 7 on the lower side of the bearing and the bearing blocks 10 in the lower part of the bearing rest with only their net weight on the bearing surface 5. Due to the fact that under these conditions the blocks do not sustain any of the load the oil film between the blocks or the outer surfaces of the blocks and surfaces 6 is not destroyed and lubrication between these surfaces is maintained. Upon rotation of the shaft in the direction of the arrow in Fig. 3, the blocks 10 will shift relatively to the inner bearing 1 to the position shown in Fig. 3, with the abutment surfaces 14 and 17 in contact and with the bearing surface $b$ in contact with the bearing surface $d$. As will be evident from the figure the bearing surface $a$ is out of contact with the bearing surface $c$ when the blocks are in this position and in a position where upon tilting of the blocks it can move radially inwardly because of the recess provided by the groove 12.

Upon commencement of rotation when the bearing is started, the circular elements 7 continue to carry the bearing load and under these conditions the bearing operates as a ball or roller bearing. As soon, however, as the bearing begins to rotate the eccentrically placed cooperating bearing surfaces $b$ and $d$ and contacting abutment surfaces tend to tilt the blocks so that the forward or leading edges thereof move radially inwardly, this movement assisting in the formation of a wedge-shaped oil film between the outer block surfaces and the bearing surface 5. Due to the formation of this oil film and the movement of the blocks into their operative load carrying positions, the load is transferred from the circular elements to the bearing blocks. The proportion of the total load which is transferred to the blocks will vary in individual cases dependent upon the speed and also upon the design of the bearing. In some instances the bearing may be designed so that the blocks, when they have reached a predetermined normal speed of operation, will operate to lift the shaft with respect to the casing sufficiently to bring the circular elements out of contact with their bearing surfaces. In other instances, it may be advantageous to so design the bearing that under normal running conditions the bearing blocks take only a part of the load, the remaining part of the load being carried by the circular elements.

The invention is applicable not only to bearings designed for rotation in one direction, but may equally well be employed in bearings of the reversible type. The construction illustrated in Fig. 3 is of this latter type. It will be evident from this figure that if the shaft 2 is rotated in a direction opposite that shown in the figure, the bearing blocks will shift with respect to the ring 1 until the abutment surfaces 15 and 18 are in contact, with bearing surface $a$ cooperating with bearing surface $c$ and with bearing surface $b$ within the groove 12 and out of contact with surface $d$. With the blocks in this position the action upon starting of the bearing will be the same as that previously described, except that the blocks when they tilt into their operative load sustaining positions will tilt in the opposite direction.

Turning now to Fig. 4, I have here shown another form of bearing embodying the invention in which the outer surface of the inner bearing member 1' follows the general contour of the bearing surface 5 of the outer bearing member 3. In this instance the surface 6, as in the form shown in Fig. 1, is disposed centrally of the bearing ring, but this ring, in the present form, is tapered to each side of the surface 6 so that the projections 11 thereon extend axially outwardly as well as radially. This form of construction results in the formation of surfaces along lines more generally normal to the load sustaining surfaces than is the case in the construction shown in Fig. 1, and under certain circumstances provides more suitable structure for carrying the specific type of load encountered.

Fig. 5 illustrates still another form of bearing, in which a single row of sliding blocks 10 is disposed centrally of the bearing, while two rows of circular elements 7 are provided, one row being axially to each side of the central row of sliding blocks. In this embodiment the form and arrangement of the sliding blocks is generally the same as that previously described, but the grooves 6' in the inner bearing ring 1" are preferably formed as shown, so that the elements 7 are situated at an angle whereby to transmit load in a direction generally normal to the surface 5. In this form of construction the cages for the rows of elements 7 may each advantageously comprise a conical ring 9' having openings or recesses therein for the reception of the individual elements.

It will be evident from the drawing that the form of construction herein disclosed provides a bearing which may be manufactured and used as a unit, since the form and disposition of the several bearing parts, which prevents axial displacement of the parts with respect to each other, permit each bearing to be handled as a unit after it has once been assembled.

While for purposes of illustration the invention has been shown as embodied in radial bearings of the type adapted to transmit load from a rotating inner member to a stationary outer member, it will be evident that the invention is applicable to other forms of radial bearings and also to thrust bearings.

It will further be evident that many modifications and changes may be made in the specific form and arrangement of the bearing parts without departing from the scope of the invention as defined by the appended claims.

What I claim is:

1. A radial bearing comprising radially spaced inner and outer bearing members and a plurality of radial load sustaining bearing elements between said members, said load sustaining elements comprising a row of circular elements adapted to engage said members in rolling contact, a row of bearing blocks arranged to slide with respect to one of said members upon rotation, and means for tilting said blocks dependent on movement thereof relative to one of said members.

2. A radial bearing comprising radially spaced inner and outer bearing members and a plurality of load sustaining elements between said members, said load sustaining elements comprising a plurality of circular elements adapted to engage said members in rolling contact and a plurality of bearing blocks, one of said members and said bearing blocks having cooperating irregular surfaces for moving the blocks upon rotation into operative load sustaining positions tilted with respect to the other of said members.

3. A radial bearing comprising radially spaced inner and outer bearing members and a plurality of load sustaining elements between said members, said load sustaining elements comprising a plurality of circular elements for sustaining the bearing load when the bearing is stationary and a plurality of sliding bearing blocks, one of said members and said blocks having surfaces cooperating upon rotation of the bearing for moving the blocks into operative load sustaining positions whereby to relieve said circular elements of at least a portion of the bearing load.

4. A radial bearing comprising radially spaced inner and outer bearing members, a row of bearing blocks, means to tilt each block to have operative radial load sustaining positions between said members upon rotation of the bearing and a row of circular elements between said members for sustaining the bearing load when the bearing is stationary.

5. A radial bearing comprising radially spaced inner and outer bearing members said members providing an axially extending clearance space therebetween, a plurality of circular load sustaining bearing elements radially between said members in one part of said clearance space and a plurality of bearing blocks radially between said members in another part of said clearance space, said circular elements having greater radial extent with respect to the part of the clearance space in which they are located than is the radial extent of the bearing blocks with respect to the part of the clearance space in which the blocks are located, and means for causing said blocks to tilt upon rotation to assume load sustaining positions.

6. A radial bearing comprising radially spaced inner and outer bearing members and a plurality of load sustaining elements having operative positions between said members, said elements comprising a row of circular elements adapted to engage said members in rolling contact and a row of bearing blocks axially to each side of said row of circular elements, said bearing blocks and one of said members having cooperating surfaces for moving said blocks into tilted load sustaining positions upon rotation.

7. A radial bearing comprising radially spaced inner and outer bearing members and a plurality of load sustaining elements having operative positions between said members, said elements comprising a row of bearing blocks, one of said members and said bearing blocks having cooperating surfaces for moving the blocks into tilted load sustaining positions upon rotation, and a row of circular bearing elements axially to each side of said row of bearing blocks, said circular bearing elements being adapted to engage said members in rolling contact.

8. A radial bearing comprising radially spaced inner and outer bearing members, a plurality of load sustaining bearing elements having operative positions radially between said members comprising a row of bearing blocks, one of said members and said blocks having cooperating surfaces for causing said blocks to rotate with said member and to slide with respect to the other member in tilted load sustaining position, a row of circular elements adapted to roll between said members and a cage for said circular elements.

9. A radial bearing comprising an inner bearing ring, an outer bearing ring radially spaced from the inner ring, a row of circular bearing elements having operative positions radially between said rings, a row of bearing blocks having operative positions radially between said rings, one of said rings and said blocks having cooperating surfaces for causing said blocks to rotate with said member and to slide with respect to the other ring and said rings and said blocks having cooperating surfaces for preventing axial displacement of the rings with respect to each other and said rings providing surfaces preventing axial displacement of the circular elements with respect to the rings.

10. A radial bearing comprising an inner bearing ring, an outer bearing ring radially spaced from the inner ring, said outer ring having a spherically curved bearing surface, a row of circular bearing elements radially between said rings, and adapted to roll with respect to said spherically curved surface, a row of bearing blocks radially between said rings, said inner ring and said blocks having abutment surfaces for causing the blocks to rotate with the inner ring and slide with respect to the outer ring, and said inner ring and said blocks having cooperating surfaces for causing said blocks to tilt with respect to said spherically curved surface upon rotation.

11. A bearing device comprising circular bearing elements for sustaining bearing load under static and starting conditions, sliding bearing blocks, and means for causing said blocks to relieve said circular elements when running conditions are established.

12. A bearing device comprising circular bearing elements for sustaining bearing load under static and starting conditions, sliding bearing blocks, and means comprising surfaces cooperating with the blocks upon movement of the device for causing the blocks to move into operative load sustaining positions whereby to relieve said circular elements from load.

13. A bearing device comprising circular bearing elements for sustaining bearing load under static and starting conditions, sliding bearing blocks, and means for automatically causing movement of said blocks to operative position when running conditions are established, to sustain bearing load and to relieve said circular elements of load.

14. A radial bearing unit comprising inner and outer bearing rings, a row of circular elements between said rings for sustaining load under static and starting conditions and a row of sliding elements between said rings, said sliding elements being movable to operative load sustaining position under running conditions and said rings and said elements having surfaces cooperating to prevent axial displacement of the parts relative to each other.

AUGUST GUNNAR FERDINAND WALLGREN.